United States Patent

Sussmann

[15] 3,645,812

[45] Feb. 29, 1972

[54] METHOD OF PURIFYING A QUARTZ PROCESSING VESSEL FOR USE IN THE PRODUCTION OF SEMICONDUCTORS

[72] Inventor: Erhard Sussmann, Poing, Germany

[73] Assignee: Siemens Aktiengesellschaft, Munchen, Germany

[22] Filed: Sept. 10, 1968

[21] Appl. No.: 758,708

[30] Foreign Application Priority Data

May 3, 1968 Germany .......................P 17 71 305.2

[52] U.S. Cl. ..............................156/17, 148/175, 148/191, 117/106
[51] Int. Cl. ............................................H01l 7/50, H01l 7/44
[58] Field of Search.....................117/106, 219, 200, 201, 8, 117/106 A; 148/175, 186, 191, 176; 156/17; 134/4

[56] References Cited

UNITED STATES PATENTS 2,419,237  4/1947  Treuting ..............................148/191

3,243,323  3/1966  Corrigan et al. ........................148/175

FOREIGN PATENTS OR APPLICATIONS 764,933  8/1967  Canada..................................148/175

*Primary Examiner*—Robert F. Burnett
*Assistant Examiner*—R. J. Roche
*Attorney*—Curt M. Avery, Arthur E. Wilfond, Herbert L. Lerner and Daniel J. Tick

[57] ABSTRACT

Described is a method of purifying a quartz processing vessel used in the production of semiconductors and more particularly for epitaxy from the gaseous phase. According to the invention, the entire inside surface of the processing vessel is provided with a highly pure silicon layer by precipitation from the gaseous phase. The silicon layer and its quartz base are thereafter tempered at a temperature of at least 1,000° C. The silicon layer is then selectively removed from its quartz base and the processing vessel is then ready for use as intended.

6 Claims, No Drawings

METHOD OF PURIFYING A QUARTZ PROCESSING VESSEL FOR USE IN THE PRODUCTION OF SEMICONDUCTORS

In the interest of purity, it is customary to effect work processes in semiconductor production in quartz vessels. More specifically, the epitactic precipitation of semiconductor layers from a gaseous phase upon the surface of monocrystalline semiconductor discs is carried out in quartz vessels. In spite of a careful selection of the quartz used to produce said vessels, it cannot be avoided that traces of impurity still penetrate into the reaction vessel. This is particularly the case if, as customary, a halogen-containing reaction gas is used and if precipitation is carried out at very high temperatures.

The apparatus is usually cleaned after a single or repeated usage, by either treating the walls with an etching agent or annealing in a vacuum or in hydrogen. It was found, however, that the purity achieved in this manner was not satisfactory.

The present invention relates to a method of purifying a quartz-processing vessel used in semiconductor production, particularly for epitaxy from a gaseous phase.

In accordance with my invention, the entire inside surface of the processing vessel is provided with a highly pure silicon layer, by thermal precipitation from the gaseous phase. The silicon layer and its quartz base are thereafter tempered at a temperature of at least 1,000° C. The silicon layer is then selectively removed or dissolved from its substrate. Finally, the treatment vessel is used in the intended manner.

Since the silicon layers, precipitated from the gaseous phase, make the reaction vessel opaque, the method of the invention provides a ready indicator during the dissolution of the silicon layer. On the other hand, this opaqueness is the reason that the deposition of silicon or other semiconductor materials upon the inside surface of the reaction vessel is prevented by all possible means during conventional epitactic precipitation. The precipitation at the walls of the reaction vessel makes the vessel opaque and results in an impairment of the quality of the precipitated silicon layers by formation of impurity atoms.

It became customary to use reaction conditions such that no precipitation occurs at the reaction vessel walls. This is made possible through the fact that the carrier body, which is comprised of the same material as the precipitating material, supplies an effective precipitation base, at particularly low temperatures, which is preferred for epitactic precipitation to all other materials. Furthermore, an unintentional precipitation of silicon would, in no case, cause the entire inside wall of the reaction vessel to be coated with a silicon layer. Still further, no adequate tempering from the viewpoint of the present invention would be ensured.

As previously suggested, the quartz used for the apparatus in semiconductor production, particularly for silicon production, should be of the type which shows no absorption properties in the range of 2.1 to 3 $\mu$ wavelength. This requirement is met by infrasil-quartz.

The vessel which is to be cleaned is heated to a temperature of for example 1,000° to 1,300° C. in a reaction gas, which is known in connection with silicon epitaxy, for example in a mixture of 0.5 Mol percent $SiHCl_3$ and 99.5 Mol percent hydrogen. This reaction gas should have the same degree of purity as that used for the direct production of semiconductors. The silicon layer is preferably at least 10 $\mu$ thick and preferably 10 to 100 $\mu$ thick. A period of 3 to 10 hours will generally be required. After the completed precipitation, the device is preferably tempered in the same apparatus, under protective gas or in a vacuum, for several hours, e.g., 5 to 10 hours. The silicon layer is subsequently completely dissolved or removed by an etching agent, suitable for etching silicon. More specifically, a mixture of hydrofluoric and nitric acids or hydrofluoric acid and hydrogen peroxide may be used. The composition of the etching agent is preferably such that the silicon layer is dissolved considerably faster than the quartz of the apparatus. It is especially preferred to dissolve the silicon layer by means of a gaseous etching agent, for example by HCl, at a temperature of 1,200° C.

The layer which is comprised of highly pure silicon provides a marked reduction of contaminations not only because of diffusion but because of variable distribution coefficients. The contaminations are thus quasi extracted from the layers adjacent the surface of the quartz apparatus and are also removed even at a distance from the silicon layer. The surface of the apparatus thus becomes depleted of contaminations and experience has shown that it takes a long time for a sufficient amount of contaminations to diffuse from inside the quartz walls to necessitate a repeated application of the instant method, even after continuous use of the apparatus.

I claim:

1. The method of purifying a quartz-processing vessel for use in the production of semiconductors which comprises precipitating a highly pure silicon layer at least 10 $\mu$ thick upon the entire inside surface of the processing vessel, thereafter tempering the silicon layer and the quartz vessel under protective gas or vacuum at a temperature of at least 1,000° C., for a period of time sufficient for impurities in the quartz vessel to be transferred to the silicon layer, thereafter selectively removing the silicon layer from the quartz vessel thereby removing contamination from the inside surface of the quartz vessel.

2. The method of claim 1, wherein the thickness of the precipitated silicon layer is from 10 to 100 $\mu$.

3. The method of claim 1, wherein the silicon layer and quartz vessel are tempered at least for 1 hour.

4. The method of claim 3, wherein the silicon layer and quartz vessel are tempered for from 3 to 10 hours.

5. The method of claim 1, wherein following the completion of the tempering step, the silicon layer is removed by etching in the gaseous phase.

6. The method of claim 1, wherein following the completion of the tempering step, the silicon layer is removed by etching with gaseous HCl at a temperature of 1,200° C.

* * * * *